No. 727,278. PATENTED MAY 5, 1903.
H. J. & J. C. BRANTLEY.
LIQUID MEASURE.
APPLICATION FILED MAR. 13, 1900.
NO MODEL. 2 SHEETS—SHEET 1.
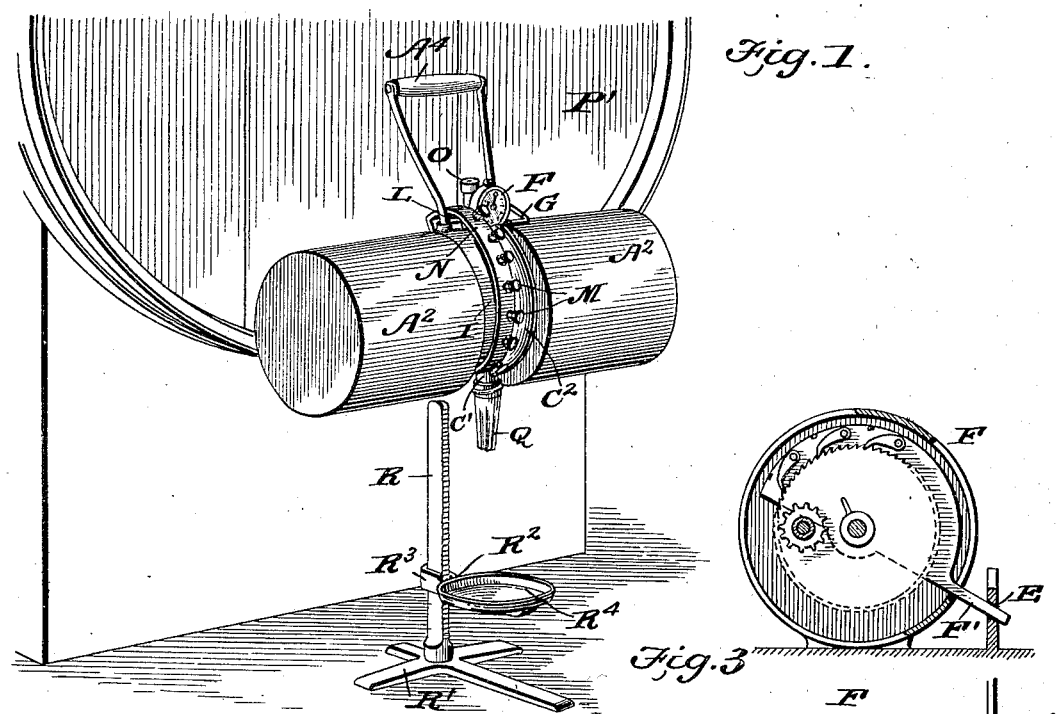
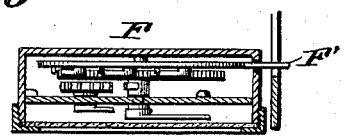
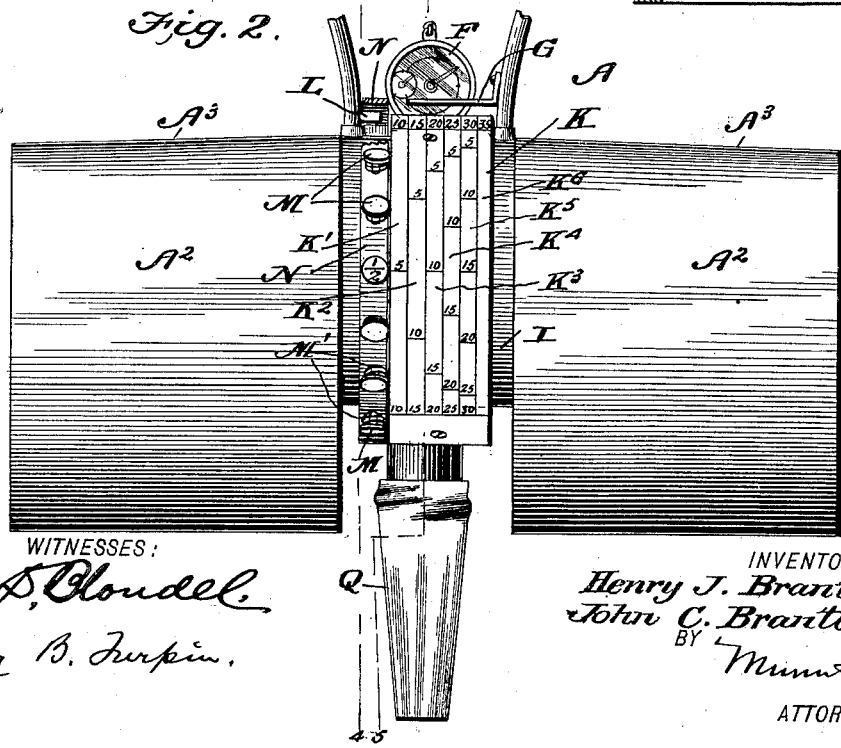
WITNESSES:
M. S. Cloudel
Perry B. Turpin
INVENTORS
Henry J. Brantley
John C. Brantley
BY Munn & Co.
ATTORNEYS

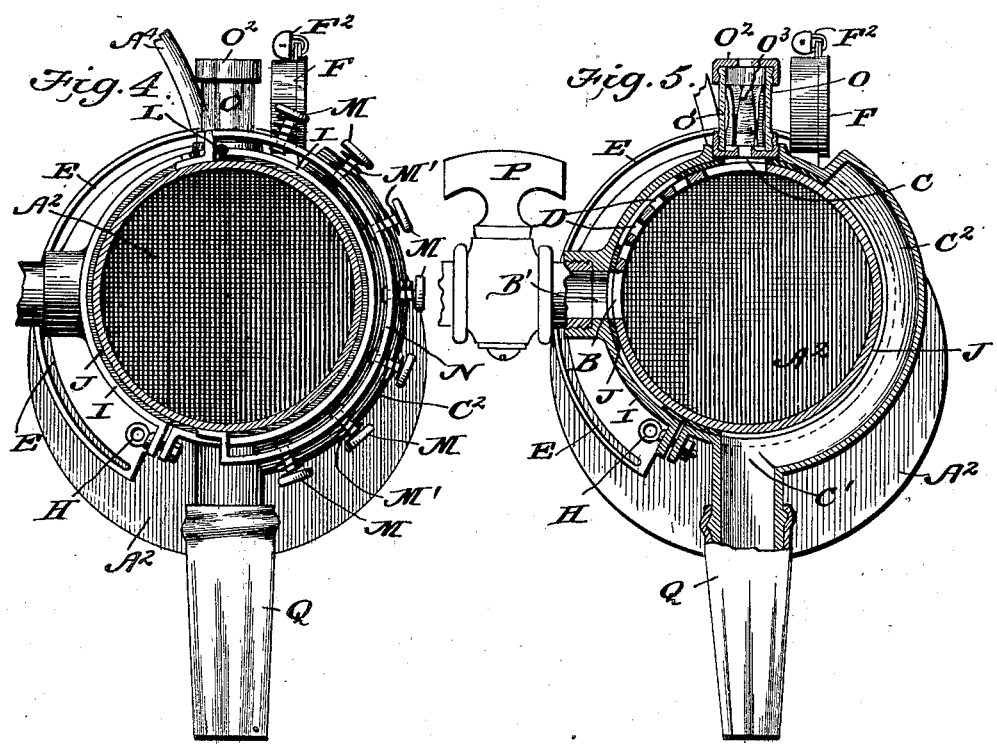
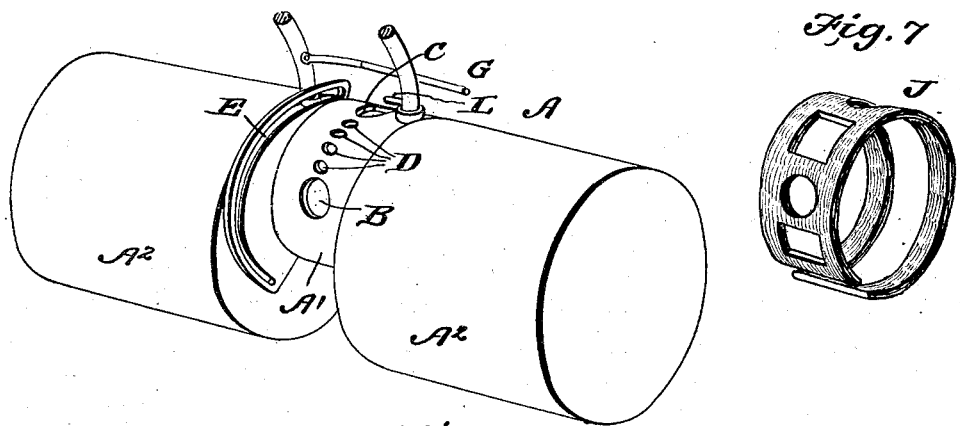
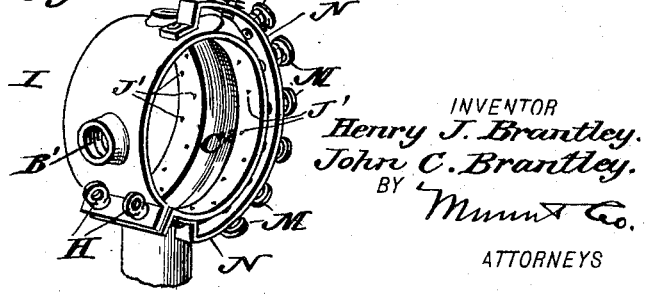

No. 727,278. Patented May 5, 1903.

UNITED STATES PATENT OFFICE.

HENRY J. BRANTLEY, OF VALDOSTA, GEORGIA, AND JOHN C. BRANTLEY, OF MARKSVILLE, MISSISSIPPI.

LIQUID-MEASURE.

SPECIFICATION forming part of Letters Patent No. 727,278, dated May 5, 1903.

Application filed March 13, 1900. Serial No. 8,478. (No model.)

*To all whom it may concern:*

Be it known that we, HENRY J. BRANTLEY, residing at Valdosta, in the county of Lowndes and State of Georgia, and JOHN C. BRANTLEY, residing at Marksville, in the county of Holmes and State of Mississippi, have made certain new and useful Improvements in Liquid-Measures, of which the following is a specification.

This invention is an improvement in measuring apparatus, and especially in that class of such apparatus designed for use in dispensing liquids; and the invention consists in certain novel constructions and combinations of parts, as will be hereinafter described and claimed.

In the drawings, Figure 1 is a perspective view of our apparatus as in use. Fig. 2 is a front view thereof. Fig. 3 is a detail view illustrating the register. Figs. 4 and 5 are cross-sectional views on respectively lines 4 4 and 5 5 of Fig. 2. Fig. 6 is a detail perspective view of the measuring vessel. Fig. 7 is a detail perspective view of the packing-strip, and Fig. 8 is a detail perspective view of the casing in the form of a cuff.

By our invention we provide a measuring apparatus in which the measuring vessel is movably supported and can be adjusted from one position in which it receives the supply of liquid from the cask or other source of supply to position to discharge such liquid. In this operation the extent to which the measuring vessel is moved from its feed or initial position controls the amount of liquid discharged from such vessel, and so operates to measure off a half-pint, pint, quart, or other desired quantity of the liquid. In connection with the measuring vessel we employ a casing in which such vessel is supported to turn, the casing having feed and discharge ports and the measuring vessel having inlet and outlet ports, and such vessel being movable bodily, so its ports may be adjusted to register with the corresponding ones of the casing in securing a supply of the liquid to and its discharge from the measuring vessel.

In the construction shown the measuring vessel A is composed of a central connecting section $A'$ and end sections $A^2$, connected with the opposite ends of the central section, through which central section the liquid to be measured is supplied and discharged. The central section $A'$ is preferably cylindrical, while the end sections $A^2$ may be of any desired form. As will be understood from Fig. 2, the walls $A^3$ of the sections $A^2$ incline toward the central section $A'$ to insure the passage into said central section of all the liquid from the end sections when the measuring vessel is adjusted from the position shown in Fig. 2 to the diametrically opposite position to which it is adjusted when it is desired to discharge entirely the contents of the measuring vessel.

The section $A'$ of the measuring vessel is provided with an inlet-port B and an outlet-port C, through which the material to be measured is supplied and discharged, and between these ports B and C we provide a number of openings D, which operate to vent the vessel while the same is being filled and emptied.

A cam E is secured to and movable with the measuring vessel and is arranged to operate the register F. By preference the cam is in the form of a slot, so it will operate the arm $F'$ of the register F in both directions and also operate said arm positively, as desired.

It is preferred in moving the measuring vessel from feed to discharge position to partially rotate the same, and for this purpose we provide it with a handle $A^4$, which may preferably be in the bail form shown, and on this handle we support an indicating-arm G, which registers along the computing-table, presently described.

In connection with the measuring vessel we provide a casing therefor having feed and discharge ports, and such casing is preferably in the form of a cuff, as shown in detail in Fig. 8, and which is arranged to clasp around the central portion $A'$ of the measuring vessel, where it may be secured by suitable clamps, as shown at H in Fig. 8. In the construction shown the casing I is clamped at H around the section $A'$ and is packed upon said section by means of a packing-strip J (shown in Fig. 7) and provided with openings corresponding to those of the casing and measuring vessel. This packing-strip J is fixed to the casing I, being preferably held thereto by roughening the inner face of the casing, as shown at J' in Fig. 8.

The casing I is provided with the feed-port B' and the discharge-port C' and is preferably provided with an outwardly-bulged chamber $C^2$, which extends forwardly and upwardly from the discharge-port C' and operates as an extension thereof and also as a means for facilitating the proper discharge of heavy liquids, such as thick syrups. To the front of the casing I we secure a computing-table K, which may be engraved upon a plate secured to the casing, as shown in Fig. 2. As shown, the measure is designed for measuring any quantity up to a gallon, and the computing-table is provided with columns K', $K^2$, $K^3$, $K^4$, $K^5$, and $K^6$, which are divided by graduations to indicate the point to which the arm G should be moved to measure off five, ten, fifteen, or twenty cents' worth of the liquid if the price be ten, fifteen, or twenty cents per gallon. Manifestly the prices and graduations of the computing-table may be varied as desired; but its utility is apparent from the foregoing description. We also provide upon the casing I a series of stops, which may be adjusted into the path of the projection L, movable with the measuring vessel and being preferably a stud projected from one of the arms of the handle $A^4$. The stops, as shown in Figs. 1, 2, 4, and 8, are pins M, which operate through a carrier-plate N, secured on the casing and are pressed normally outward by springs M', bearing between the plate N and the heads of the stop-pins. These pins M are arranged at suitable points to stop the measuring vessel in position to discharge predetermined quantities of the liquid. It may be a half-pint, pint, &c., or any other desired quantity. The stud L projects beneath the plate N in position to engage any one of the stop-pins M that may be pushed inward. The operation is as follows: If a quart be desired, the operator pushes in the proper pin M and then draws the measuring vessel from the position shown in Fig. 5 forward and downward until the stop L engages the pushed-in pin M, when the measuring vessel can be permitted to stand until the quart has drained into the jug or other vessel set to receive it.

Upon the casing I we support a vent O, which may have a glass body O', a perforated cap $O^2$, and a float-valve $O^3$, which when lowered, as shown in Fig. 5, permits the venting of the measuring vessel, but which when raised by the liquid in the measuring vessel will operate to close the opening in the perforated cap $O^2$, and thus prevent any waisting of the liquid.

The register F may in general respects be of any desired construction. As shown, it has its operating-arm F' extended and operating in the cam-slot of the measuring vessel. The arm F rocks on the shaft of the register and has pawls for operating the ordinary register-wheel, and suitable registering and multiplying devices may be employed, as is usual in registers.

In the operation of the apparatus when the parts are as shown in Fig. 5 the faucet P, between the measuring vessel and the barrel P' or other source of supply, may be opened, and the measuring vessel will fill through the ports B' B. In this position of the parts it will be seen the discharge-port C' of the casing is out of register with the discharge-port C of the measuring vessel, so the measuring vessel will fill and none of its contents will escape through the discharge-port of the casing. If now the measuring vessel be turned from the position shown in Fig. 5 forward until its discharge-port C communicates with the extension $C^2$ of the discharge-port C', it is manifest the liquid in the measuring vessel may pass out of port C and thence through ports $C^2$ and C' to an extent equaling the forward-and-downward movement of the measuring vessel. To register the amount, the cam E rises gradually from the point where it engages the arm F' of the register in the position shown in Fig. 5, so that said arm will be lifted by the cam to an extent corresponding with the movement of the measuring vessel, so the register will accurately indicate the amount of liquid which has been withdrawn through the measuring vessel. The register may be suitably secured in position and protected by a lock $F^2$, so it cannot be tampered with.

We usually provide a number of nozzles Q of different sizes and apply them as needed removably to the outlet-pipe leading from the discharge-port C'. This may preferably be effected by threading the nozzles Q in place, as shown in Figs. 4 and 5.

To support the jug or other receptacle below the measuring vessel, we provide the construction shown in Fig. 1, in which a suitable upright R is mounted on a base R' and receives a shelf $R^2$, which is looped at $R^3$ on the standard R, so it can be adjusted up or down to suit the height of the jug or other receptacle which may be placed on the pan $R^4$, which may receive any drip. This adjustable support for the jug avoids the necessity of holding said jug in the hand and permits the ready fitting of any height of jug close to the discharge of the apparatus as is desired.

Of course it will be understood that we do not restrict ourselves to the particular size of the measuring vessel described; but the vessel may be made to measure quantities up to two or five gallons or may be given any other capacity desired.

By constructing the measuring vessel with a central journal portion and with the reservoir portions on opposite sides of the same I distribute the weight of such vessel and of the reservoir portions thereof so the measuring vessel can be easily turned and there will be no twisting strain in the bearing portion of the casing.

Having thus described our invention, what we claim, and desire to secure by Letters Patent, is—

1. An apparatus substantially as herein described comprising the measuring vessel composed of the central section having inlet and outlet ports, and the sections connected with the opposite ends of said central section, such measuring vessel being provided with a cam and with a handle by which the vessel may be moved, and with an indicating-bar adapted to register with the computing-table, the casing embracing the central section of the measuring vessel and having feed and discharge ports and a valve-controlled vent, and having an enlarged portion or chamber communicating with and forming an extension of its discharge-port, the series of stops arranged on said casing and arranged to be projected into the path of a projection on the measuring vessel, springs for normally pressing such stops out of the path of such projection, the computing-table fixed relatively to the measuring vessel, and the register having a projecting arm or portion engaged by the cam of the measuring vessel, substantially as set forth.

2. In an apparatus substantially as described, a measuring vessel composed of end sections and a cylindrical central connecting-section through which the material to be measured is supplied and discharged, the cylindrical section having its axis in the direction of the opposite end sections.

3. An apparatus substantially as described, comprising a casing having feed and discharge ports, a measuring vessel having a central section and end sections at the opposite ends of the central section, the latter being provided with inlet and outlet ports to register with the corresponding ports of the casing, and the end and central sections being movable bodily, substantially as and for the purposes set forth.

4. An apparatus substantially as described, comprising the casing and the measuring vessel composed of a central section journaled in the casing and end sections connected with the opposite ends of the central section.

5. The combination in an apparatus, substantially as described, of the measuring vessel composed of end sections and a central cylindrical section through which the material to be measured is supplied to and discharged from the end sections, the casing embracing the central connecting section and having feed and discharge ports, and a series of independently-movable stop-pins whereby to limit the movement of the measuring vessel within its casing, substantially as set forth.

6. An apparatus substantially as described comprising a casing, a measuring vessel having a central section journaled in the casing and provided with a discharge-opening, and sections secured to the opposite ends of the central section and having their sides inclined toward the discharge-port of the central section, substantially as set forth.

7. In a measuring apparatus substantially as described, the combination of the measuring vessel having a section through which the material to be measured is fed and discharged, and a casing embracing said section and controlling the feed and discharge of material, said casing embodying a plate fitted around the section of the measuring vessel, and clamping devices connecting the ends of said plate substantially as set forth.

8. In a measuring vessel substantially as described, the combination of the measuring vessel having a portion forming a journal whereby the measuring vessel may be turned and having adjacent to said portion a radially-projecting and circumferentially-extending plate provided with a cam-slot which departs from the axis of the journal, and the casing providing a bearing for said journal, and the register having a projecting arm or portion operating in the said slot, substantially as set forth.

9. The combination substantially as herein described of the measuring vessel having a central journal portion provided with inlet and outlet ports, and reservoir portions on opposite sides of and communicating with the journal portion and arranged to be filled and to be discharged through the said journal portion, and the casing having a bearing for the said journal portion, substantially as set forth.

HENRY J. BRANTLEY.
JOHN C. BRANTLEY.

Witnesses:
JOHN LOTKA,
EVERARD BOLTON MARSHALL.